US009143972B2

(12) United States Patent
Tao et al.

(10) Patent No.: US 9,143,972 B2
(45) Date of Patent: Sep. 22, 2015

(54) METHOD FOR ESTABLISHING COMP COOPERATING SET IN COORDINATED MULTI-POINT COMMUNICATION

(75) Inventors: Xiaofeng Tao, Beijing (CN); Xiaodong Xu, Beijing (CN); Qimei Cui, Beijing (CN); Ping Zhang, Beijing (CN); Xin Chen, Beijing (CN); Hongjia Li, Beijing (CN); Qiang Wang, Beijing (CN); Jie Ni, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 171 days.

(21) Appl. No.: 13/884,368

(22) PCT Filed: Oct. 27, 2011

(86) PCT No.: PCT/CN2011/081384
§ 371 (c)(1),
(2), (4) Date: May 9, 2013

(87) PCT Pub. No.: WO2012/062166
PCT Pub. Date: May 18, 2012

(65) Prior Publication Data
US 2013/0223272 A1 Aug. 29, 2013

(30) Foreign Application Priority Data
Nov. 12, 2010 (CN) .......................... 2010 1 0544390

(51) Int. Cl.
*H04W 72/04* (2009.01)
*H04W 72/00* (2009.01)
(Continued)

(52) U.S. Cl.
CPC .............. *H04W 24/10* (2013.01); *H04B 7/024* (2013.01); *H04B 7/0626* (2013.01); *H04W 72/0426* (2013.01); *H04W 92/20* (2013.01)

(58) Field of Classification Search
CPC ........................ H04W 72/04; H04W 72/00
USPC .............. 455/422.1, 509, 517; 370/329, 330, 370/331, 468, 390, 252, 254
See application file for complete search history.

(56) References Cited

U.S. PATENT DOCUMENTS

2010/0246524 A1 9/2010 Hou et al.
2011/0034163 A1* 2/2011 Zhu et al. ................... 455/422.1
(Continued)

FOREIGN PATENT DOCUMENTS

CN 200910203029.9 A 3/2010
CN 200910082687.7 A 10/2010
(Continued)

OTHER PUBLICATIONS

International Search Report (Chinese) issued in International Application No. PCT/CN2011/081384, mailed Feb. 16, 2012.
(Continued)

*Primary Examiner* — Hanh N Nguyen
(74) *Attorney, Agent, or Firm* — McCarter & English, LLP; Jill A. Mello, Esq.; Kia L. Freeman, Esq.

(57) ABSTRACT

Disclosed is a method for establishing a CoMP cooperating set in coordinated multi-point communication, the method comprising the steps of: triggering and starting a coordinated multi-point communication process; according to channel state information of all cells in a measurement cell set measured by a UE, determining a candidate CoMP cooperating set; sending a CoMP cooperating set establishment request to eNodeBs of the cooperating cells in the determined candidate CoMP cooperating set; the eNodeBs being of the cooperating cell and receiving the CoMP cooperating set establishment request responding to the CoMP cooperating set establishment request to the eNodeB of the serving cell of the UE, and sending a CoMP cooperating set establishment response to the eNodeB of the serving cell of the UE; the eNodeB of the serving cell of the UE determining a CoMP cooperating set of the UE according to information of the CoMP cooperating set establishment response; and according to a coordinated multi-point communication mode, sharing data information and service bearer information of the UE of the CoMP cooperating set. The present invention guarantees coordinated multi-point joint transmission/reception, decreases the overhead and complexity of the communication system and furthermore reduces the time delay in the information exchange.

9 Claims, 5 Drawing Sheets

(51) Int. Cl.
  *H04W 24/10* (2009.01)
  *H04B 7/02* (2006.01)
  *H04B 7/06* (2006.01)
  *H04W 92/20* (2009.01)

(56) References Cited

U.S. PATENT DOCUMENTS

| | | | |
|---|---|---|---|
| 2011/0182200 A1 | 7/2011 | Wan et al. | |
| 2011/0255526 A1 | 10/2011 | Kaneko et al. | |
| 2012/0135771 A1* | 5/2012 | Futaki | 455/509 |
| 2013/0223272 A1 | 8/2013 | Tao et al. | |

FOREIGN PATENT DOCUMENTS

| | | |
|---|---|---|
| CN | 201010544390.0 A | 3/2011 |
| CN | 200910023170.0 A | 2/2012 |
| JP | 2010154262 A | 7/2010 |
| JP | 2010246113 A | 10/2010 |
| WO | 2010102424 A1 | 9/2014 |

OTHER PUBLICATIONS

International Search Report (English) issued in International Application No. PCT/CN2011/081384, mailed Feb. 16, 2012.
International Preliminary Report on Patentability (Chinese) issued in International Application No. PCT/CN2011/081384, dated May 14, 2013.
International Preliminary Report on Patentability (English) issued in International Application No. PCT/CN2011/081384, dated May 14, 2013.
Written Opinion (Chinese) issued in International Application No. PCT/CN2011/081384, mailed Feb. 16, 2012.
Written Opinion (English) issued in International Application No. PCT/CN2011/081384, mailed Feb. 16, 2012.
CATT, "The Scheduling Priority in CoMP," 3GPP TSG RAN WG2 Meeting #67, R2-094332, Aug. 28, 2009.

* cited by examiner

METHOD FOR ESTABLISHING COMP COOPERATING SET IN COORDINATED MULTI-POINT COMMUNICATION

RELATED APPLICATIONS

This application is a 35 U.S.C. §371 national stage filing of International Application No. PCT/CN2011/081384, filed Oct. 27, 2011, which claims priority to Chinese Application No. 201010544390.0, filed Nov. 12, 2010. The entire content of PCT/CN2011/081384 is incorporated herein by reference.

FIELD OF THE INVENTION

This invention relates to wireless communication network field, especially a method for establishing CoMP cooperating set in coordinated multi-point communication (CoMP communication).

DESCRIPTION OF THE RELATED ART

With people's constant pursuit of high data rate, high quality and diversified mobile communication service, the standardization work of next generation mobile communication system has started. 3GPP LTE-Advanced mobile communication system, which is commonly considered as a 4G mobile communication system standard, puts higher requirement on peak rate, spectrum efficiency, system throughput, and cell-edge performance. Coordinated multi-points transmission/reception (CoMP) technology, as one of major research directions of 3GPP LTE-Advanced mobile communication system, is considered as one of key technologies to improve user experience, reduce inter-cell interference, reinforce cell-edge performance, and promote entire system throughput, i.e. multiple scattered transmission points which are independent with each other on geographic locations provide service for multiple user equipments (UEs) via different cooperative ways such as joint transmission, joint processing, and coordinated scheduling, etc. Wherein, multiple transmission points may be a base station with a complete resource management module, a base band processing module, and a radio frequency unit; or multiple radio frequency units and antennas (for example, distributed antennas) with different geographic locations; or relay nodes. Depending on whether respective cooperating cells shares data information of UE or not, coordinated multi-points communication technology is divided into two categories of joint processing (JP) and coordinated scheduling/beamforming (CS/CB).

Joint processing takes advantage of space diversity from antennas of different cell base stations to users to promote cell-edge user performance, and is further divided into two categories of joint transmission and dynamic cell selection. Wherein, joint transmission means the physical downlink shared channel (PDSCH) via which multiple cells send bearing user data information with same time-frequency resources; dynamic cell selection means that the UEs dynamically select a certain cell at the same time point and send PDSCH to it. Coordinated scheduling/beamforming takes advantage of the information exchanges between different cells to reduce inter-cell interference by scheduling resources (time, frequency, space, etc.), which includes beamforming vectors scheduling, so as to promote cell-edge performance and improve system throughputs. In the CoMP network architecture, 3 basic concepts of serving cell, CoMP cooperating set (CCS) and CoMP transmission points (CTP) are defined. The serving cell means the cell which sends PDCCH to the UEs; the CoMP cooperating set means the set of cells which transmits PDSCH to the UEs directly or indirectly; the CoMP transmission points mean the set of cells which directly transmits PDSCH to the UE. The CoMP transmission points are included in the CoMP cooperating set, i.e. the CTP are included in the CCS, as shown in FIG. 1a. As for joint transmission, the CoMP transmission points are consisted of the serving cell and one or more cells which provide data transmission; as for dynamic cell selection, the CoMP transmission points only include one cell; as for coordinated scheduling/beamforming, the CoMP transmission points only include the serving cell, as shown in FIG. 1b. In addition, LTE-Advanced follows the concept of measurement set in LTE Rel.8, and the measurement set is defined by 3GPP RAN1.

Smooth establishment of CoMP cooperating set is one of key points to implement CoMP. In order to provide CoMP communication, firstly it needs to select and establish CoMP cooperating set (CCS) for the UE. During the course of establishing CoMP cooperating set, it needs information exchanges among the cells, the eNodeBs and the UEs, and this information includes various control signaling, channel state information (CSI), user data information, etc. The requirement of large amount of information exchanges brings great challenge on delay, complexity and system overhead for CoMP during the course of establishing CoMP cooperating set. Therefore, it is an urgent problem to be solved for CoMP communication technology on how to determine reasonable CoMP cooperating set establishing procedure, determine the way, the content, and the sequence of information exchanges among the cells, the eNodeBs and the UEs, and guarantee CoMP cooperating communication going smoothly, and furthermore reduce delay so as to decrease system overhead.

DISCLOSURE OF THE INVENTION

Technical Problem

The technical problem to be solved is how to provide a method for establishing CoMP cooperating set in CoMP communication so as to reduce delay of information exchanges, to decrease overhead and complexity of the communication system, and furthermore to guarantee coordinated multi-points joint transmission.

Technical Solution

In order to solve the technical problem above, the present invention provides a method for establishing CoMP cooperating set in coordinated multi-point communication, comprising the following steps:

S1, triggering and starting a CoMP communication process;

S2, the evolution base station eNodeB, to which a serving cell of a user equipment (UE) belongs, configuring a measurement set, and sending the configured measurement set to the UE, and meanwhile the UE measuring the channel state information (CSI) of all the cells in said measurement set;

S3, the UE feeding back measurement results to the eNodeB to which the serving cell belongs;

S4, the eNodeB, to which the serving cell of the UE belongs, determining a candidate CoMP cooperating set (CCS) of the UE;

S5, the eNodeB, to which the serving cell of the UE belongs, sending a CCS establishment request to other eNodeBs, said other eNodeBs being the eNodeBs, to which the CoMP cooperating cells in the candidate CoMP cooperating set belong and which are different from the eNodeB to which said serving cell belongs;

S6, the eNodeBs, to which said CoMP cooperating cells which receive the CCS establishment request belong, making a response to said CCS establishment request to the eNodeB, to which the serving cell of the UE belongs, and sending CCS establishment response information to the eNodeB to which the serving cell of the UE belongs;

S7, the eNodeB, to which the serving cell of the UE belongs, determining UE's CCS according to said CCS establishment response information;

S8, according to the selected CoMP communication mode, all the cells in UE's CCS sharing data information and service bearing information of the UE to which said CCS belongs.

Wherein said CoMP being UE-specific, said CoMP cooperating set being also UE-specific, each UE corresponding to one CoMP cooperating set, and UE's serving cell being included in the CCS corresponding to the UE.

Wherein said triggering and starting a CoMP communication process being launched by the UE or the network side.

Wherein, in Step 1, the steps of triggering and starting CoMP processes being launched by the UE comprising: UE sending a CoMP communication process starting request to the network side according to its service demands and present channel state information, then the network side determining whether to start CoMP communication process for the user according to present system status and user related information; the steps of triggering and starting a CoMP communication process being launched by the network side comprising: the network side deciding whether to start according to UE's service demands and present system status, and executing a procedure of starting CoMP processes when deciding to start.

Wherein, in Step 4, the method of the eNodeB to which the serving cell of the UE belongs selecting UE's candidate CCS according to measurement result fed back by the UE being: one or more of the method based on delay skew, the method of RSRP intensity based on received reference signals, the method based on channel state information and the method based on channel quality indicator (CQI).

Wherein, in Step 5, the format of the CCS establishment request sent by the eNodeB to which the serving cell of the UE belongs being an X2 application protocol message of control plane of LTE X2 interface.

Wherein the CCS establishment request comprising one or more of following information: the ID of the serving cell of the UE, the target cell ID, the UE identification information; UE's service bearing information; the period of sending the CCS establishment response information by the eNodeB to which all the cells in said candidate CCS belong; a resource status report request, and the resource status report request being for the eNodeB to which the serving cell of the UE belongs, to request the eNodeBs, to which CoMP cooperating cells in the determined candidate CCS belong and which being different from the eNodeB to which the serving cell belongs, to report the present resources status related information of the CoMP cooperating cells; and information of CoMP communication mode.

Wherein, in Step S6, the steps of the eNodeBs, to which said CoMP cooperating cells which receive the CCS establishment request belong, sending a response to said CCS establishment request to the eNodeB, to which the serving cell of the UE belongs, particularly comprising:

S61, after a eNodeB, to which said CoMP cooperating cells belong, receiving the CCS establishment request, determining whether to accept the CCS establishment request according to the load and resource usage condition of the cell identified in the CCS establishment request and the UE service bearing information provided in the CCS establishment request;

S62, the eNodeB, to which said CoMP cooperating cells belong, sending the CCS establishment response information to the eNodeB, to which the serving cell belong, wherein if the CCS establishment request is accepted, sending an acceptance ID and preparing to receive UE's data information, and if the CCS establishment request is rejected, sending a rejection ID;

S63, if the resource status report request information is included in the CCS establishment request and the eNodeB, to which said CoMP cooperating cells belong, accepts the CCS establishment request, sending the resource status report request information.

Wherein, in Step S7, after the eNodeB, to which the serving cell belongs, receiving the CCS establishment response from the eNodeBs, to which the candidate cooperating cells belong, including the serving cell of the UE and the cell that accepts the CCS establishment request into the CCS so as to determine UE's CCS finally; if all the cooperating cells in the candidate CCS rejects the CCS establishment request, returning to Step S1 to reselect.

Wherein, in Step S8, after the CCS is determined, all the cells in CCS sharing data information of the UE to which said CCS belongs, wherein the way of sharing data information is: the eNodeB to which the serving cell of the UE belongs sending UE's data information to each CoMP cooperating cell in the CCS via user plane of the LTE X2 interface; or a core network sending UE's data information directly to each CoMP cooperating cell in the CCS via user plane of LTE S1 interface.

Technical Effect

This invention designs a method for establishing CoMP cooperating set in circumstance of joint processing of CoMP communication, clarifies the flow steps of the CoMP cooperating set selection and establishment, gives the detailed content and format of the information which needs to be exchanged between a user side and a network side when establishing the CoMP cooperating set, so as to reduce delay of information exchanges, decrease overhead and complexity of the communication system, and furthermore guarantee coordinated multi-points joint transmission.

DETAIL DESCRIPTION OF THE EMBODIMENTS

In the following, this invention will be further described in combination with the figures and specific embodiments.

Figure 1A:
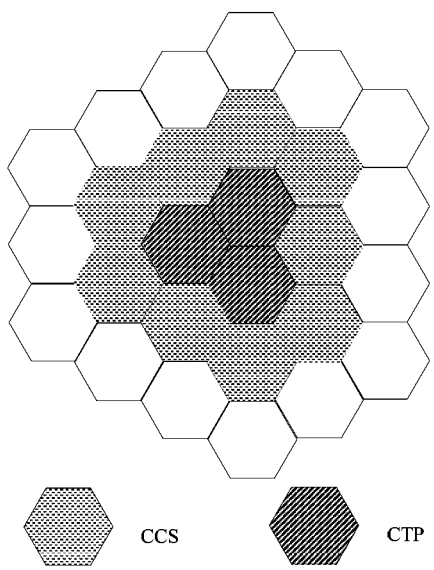
FIG. 1a is a schematic diagram of CCS circumstance.
Figure 1B:
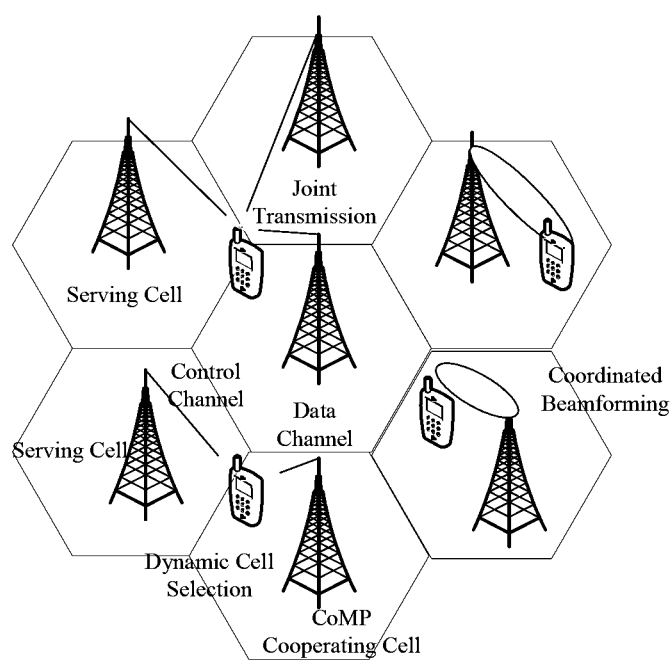
FIG. 1b is a schematic diagram of CTP circumstance.
Figure 2:
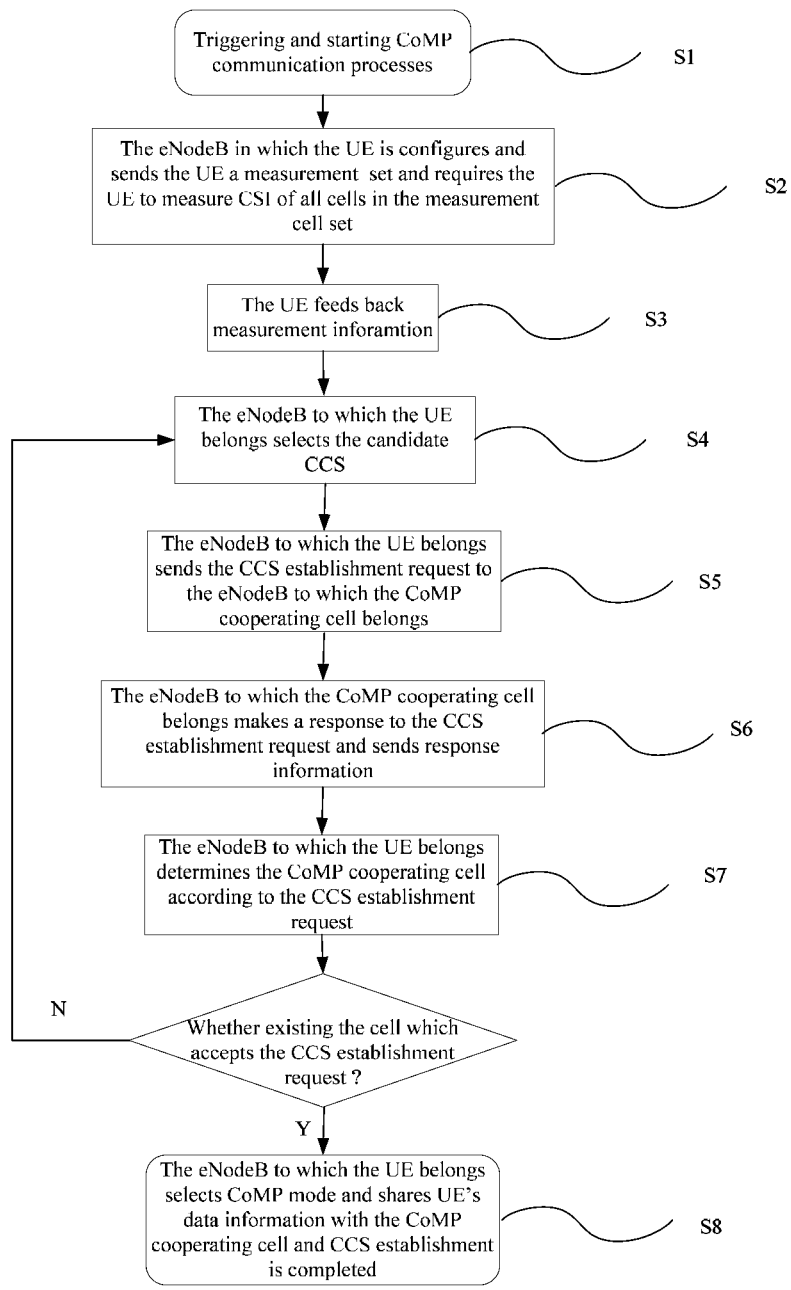
FIG. 2 is a flow chart of CCS establishment of the present invention.

This invention provides a method for establishing CoMP cooperating set in joint processing (JP) circumstance of CoMP (especially downlink CoMP communication) system. As shown in FIG. 2, said method comprises following steps:

S1, trigger and start a CoMP communication process.

S2, an evolved base station eNodeB, to which a serving cell of a user equipment (UE) belongs, configures a measurement set, and sends the configured measurement set to the UE, and meanwhile the UE measures the channel state information of all the cells in said measurement set so as to obtain measurement information.

S3, the UE feeds back measurement results to the eNodeB to which the serving cell belongs;

S4, the eNodeB to which the serving cell of the UE belongs determines a candidate CoMP cooperating set (CCS) of the UE;

S5, the eNodeB to which the serving cell of the UE belongs sends a CCS establishment request to other eNodeBs via LTE X2 interface, said other eNodeBs are the eNodeBs, to which the CoMP cooperating cells in the candidate CoMP cooperating set belong and which are different from the eNodeB to which said serving cell belongs. The LTE X2 interface is an interface among eNodeBs and is defined by 3GPP.

S6, the eNodeBs to which said CoMP cooperating cells which receive the CCS establishment request belong makes a response to said CCS establishment request to the eNodeB to which the serving cell of the UE belongs, and sends a CCS establishment response to the eNodeB to which the serving cell of the UE belongs.

S7, the eNodeB to which the serving cell of the UE belongs determines UE's CCS according to said CCS establishment response.

S8, according to the selected mode of CoMP communication, all the cells in the determined UE's CCS share data information and service bearing information of the UE to which said CCS belongs. Wherein, data information means the data needs to be sent to a user.

In the method above, CoMP communication aims at users, i.e. UE-specific CoMP communication; therefore the CCS is also UE-specific, i.e. each UE corresponds to one CCS, and cells included in the CCS of different UEs may be the same, or not the same. The serving cell of the UE is included in the CCS corresponding to the UE.

Wherein, in Step 1, triggering and starting a CoMP communication process is user-specific. In particular, UE sends a CoMP communication process starting request to the network side according to its service requirement and present channel state information, then the network side determines whether to start CoMP communication for the user according to present system status and user related information; alternatively, the network side directly decides whether to start according to UE's service requirement and present system status, and executes steps of starting a CoMP communication process when deciding to start. Wherein, the user related information may include information such as user's Qos demands, user's location, user's channel status, user's moving speed, and so on.

Wherein, in Step S2, the mechanism for the UE to measure the channel state information of all the cells of the CoMP cooperating set is the same as the existing measurement mechanism in LTE Rel.8.

Wherein, in Step S3, feedback measurement results may be measurement results of all the cells in the CoMP cooperating set in respect of the UE, and may also be measurement results of the partial cells in the CoMP cooperating set in respect of the UE, i.e. the UE selectively feeds back the measurement results of partial cells in the CoMP cooperating set. Particularly, the feedback measurement results include combination of one or more of identification (ID) of each measurement cell, transmission delay from each measurement cell to the UE, reference signal received power (RSRP) intensity of each measurement cell, channel state information (CSI) between the UE and each measurement cell, and channel quality indicator (CQI) between the UE and each measurement cell, and also be or include other measurement information.

Wherein, in Step 4, the eNodeB to which the serving cell of the UE belongs may determine the candidate CCS according to information fed back by the UE. It can be selected based on delay skew of, for example some cells, the difference between whose delay skew to the UE and the delay skew of the serving cell to the UE is less than a certain threshold; or it can be selected based on RSRP intensity of, for example some cells of which RSRP intensity is the greatest or greater than a certain threshold; or it can be selected based on CQI of, for example some cell with best CQI; or combination of some selection standards above, and also can be or include other selection standards.

Wherein, in Step 4, the eNodeB to which the serving cell of the UE belongs may also directly take the candidate CCS selected and fed back by the UE to be candidate CCS determined by the eNodeB.

Wherein, in Step 5, the format of the CCS establishment request sent by the eNodeB to which the serving cell of the UE belongs is an X2 application protocol (X2AP) message of control plane of the LTE X2 interface, or may be other signaling.

Said message or signaling includes: the ID of the serving cell in which the UE is, the target cell ID, and the UE identification information. The CCS establishment request can also include UE's service bearing information; UE's service bearing information further includes the type of user's service, the requirement of data rate, QoS related information, upper layer information, etc.; further includes the sending period of CCS establishment response information, which is sent by the eNodeB to which all the cells in the candidate CCS belong and required by the eNodeB to which the serving cell of the UE belongs, and the period is configured by the eNodeB to which the serving cell of the UE belongs; further includes a resource status report request, and the request is for the eNodeB to which the serving cell of the UE belongs to request the eNodeBs, to which CoMP cooperating cells in candidate CCS determined belong and is different from the eNodeB which the serving cell belongs (mean the eNodeB to which the CoMP cooperating cells belong, and the eNodeB to which said serving cell belongs is different from the eNodeB to which said cooperating cells belong), to report present resources status related information of the CoMP cooperating cells. The resource status related information further includes system load condition of CoMP cooperating cell, usage allocation condition of CoMP cooperating cell resources, interference condition of CoMP cooperating cell resources, and so on. The CCS establishment request can also include CoMP communication mode information, and the CoMP mode information in JP circumstance includes joint transmission, dynamic cell selection, and so on.

Wherein, in Step S6, the format of CCS establishment response information can be a X2 application protocol message of the control plane of the LTE X2 interface, or likely other signaling. Said message or signaling includes: the ID of the serving cell in which the UE is, the target cell ID, and ID of accepting or rejecting CoMP communication; can also include the reason of rejection or acceptance; can also include resource status report information, which further includes system load condition of CoMP cooperating cell, usage allocation condition of CoMP cooperating cell resources, interference condition of CoMP cooperating cell resources, and so on.

If, in Step S5, the CCS establishment request includes the period of sending CCS establishment response configured by the eNodeB to which the serving cell of the UE belongs, then, in Step S6, the eNodeBs to which the CoMP cooperating cells that receive the CCS establishment request belong send the CCS establishment response information according to above period.

In Step S6, the steps of the eNodeBs to which said CoMP cooperating cells which receive the CCS establishment request belong sending a response to said CCS establishment request to the eNodeB to which the serving cell of the UE belongs particularly comprise:

S61, after a eNodeB to which said CoMP cooperating cells belong receive the CCS establishment request, it determines whether to accept the CCS establishment request according to the load and resource usage condition of the cell identified in the CCS establishment request and the UE's service bearing information provided in the CCS establishment request;

S62, the eNodeB to which said cooperating cells belong sends the CCS establishment response information to the eNodeB to which the serving cell belongs, wherein if the CCS establishment request is accepted, then it sends an acceptance ID and prepares to receive UE's data information, and if the CCS establishment request is rejected, then it sends a rejection ID;

S63, if the resource status report request information is included in the CCS establishment request and the eNodeB to which said cooperating cells belong accepts the CCS establishment request, the resources status report request information is sent.

Wherein, in Step S7, after the eNodeB to which the serving cell belong receives the CCS establishment response from the eNodeBs to which the candidate cooperating cells belong, it includes the serving cell in which the UE is and the cell that receives the CCS establishment request into the CCS so as to determine UE's CCS finally. If all the cooperating cells in the candidate CCS reject the CCS establishment request, the procedure returns to Step S1 to choose again.

Wherein, in Step S8, when the CCS is determined, all the cells in the CCS share the data information of the UE to which the CCS belongs. Wherein the way of sharing data information may be that the eNodeB to which the serving cell belongs sends UE's data information to each CoMP cooperating cell in the CCS via user plane of the LTE X2 interface; or the core network sends UE's data information directly to each CoMP cooperating cell in the CCS via user plane of LTE S1 interface. Wherein, the LTE S1 interface is defined in LTE, and it means the interface between the eNodeB and the core network.

Wherein, if, in Step S5, said CCS establishment request doesn't include UE's service bearing information, then, in Step S8, the CCS needs to share UE's service bearing information when it shares UE's data information, and the way of sharing UE's service bearing information may be that the eNodeB to which the serving cell belongs sends UE's service bearing information to each CoMP cooperating cell in the CCS via the control plane of the LTE X2 interface, or the core network sends UE's service bearing information to each CoMP cooperating cell in the CCS via the control plane of the LTE S1 interface.

Wherein after Step S8 is finished, CCS establishment is completed, and then coordinated multi-points data transmission procedure in respect of the UE begins. After CoMP is over, CCS release procedure needs to be executed.

In the following, examples will be given to illustrate the method in present invention.

Embodiment I

Figure 3:
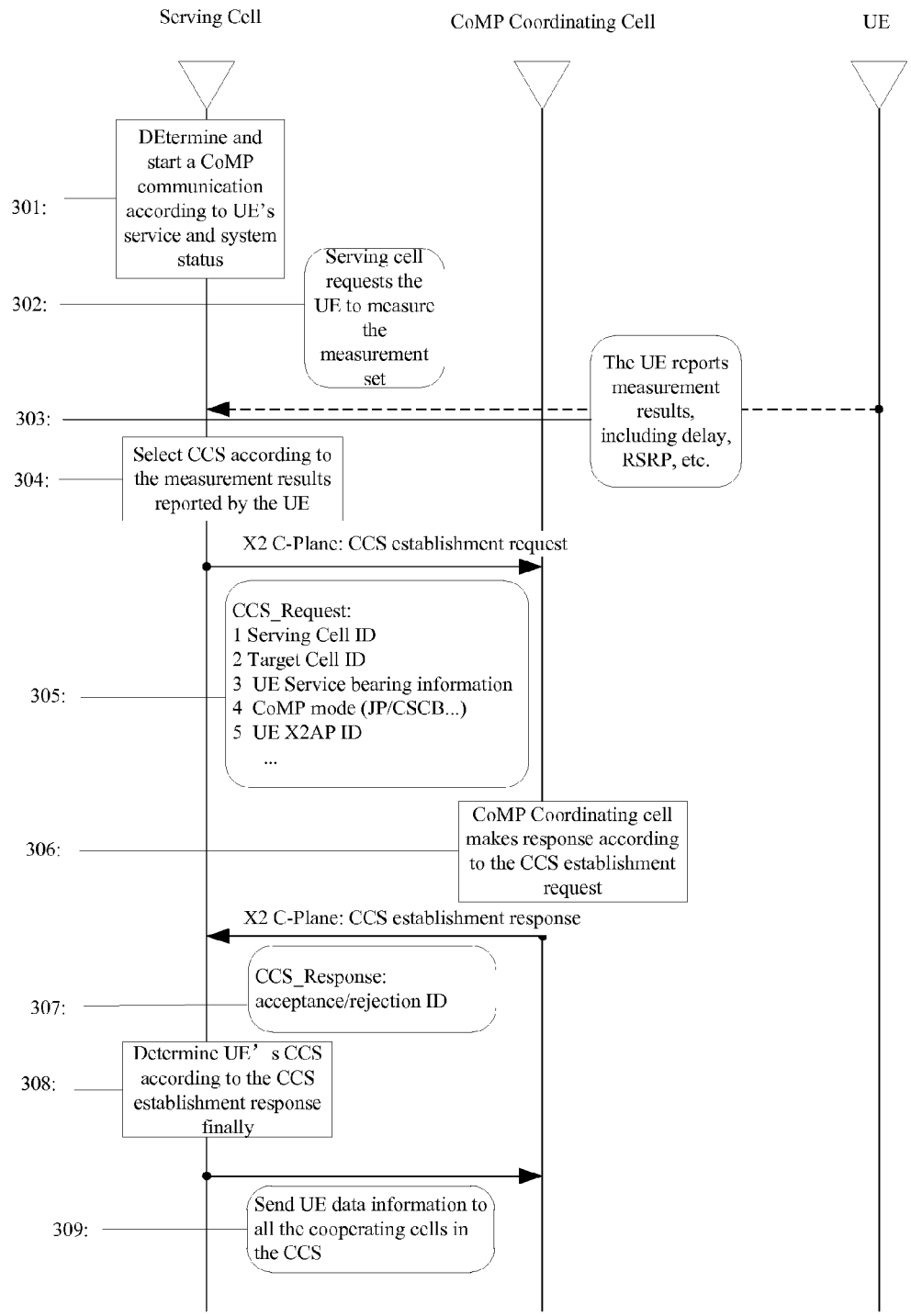
FIG. 3 is a time sequence chart of CCS establishment and information exchanges of embodiment I of the present invention.

An implement procedure and information exchange process of the CCS establishment method in JP circumstance of downlink CoMP communication is shown in FIG. 3, includes following steps:

301, the network side determines and starts a CoMP communication process according to UE's service requirement and present system status;

302, the eNodeB to which the serving cell of the UE belongs configures the measurement set and sends the configured measurement set to the UE, and meanwhile the UE measures the channel state information of all the cells in the measurement set. Herein, the concept of measurement set and measurement mechanism is the same as those in 3GPP Rel.8.

303, the UE feeds back measurement result to the eNodeB to which the serving cell belongs, and the measurement result includes transmission delay from the measurement cell to the UE, RSRP intensity of the measurement cell and measurement cell ID corresponding to the measurement result, and also can include specific channel state information such as CSI and CQI. Herein, the measurement result fed back by the UE can be the measurement result of all the measurement cells, and also can be the measurement result of partial measurement cells selected by the UE.

304, the eNodeB to which the serving cell of the UE belongs selects UE's candidate CCS according to the measurement result fed back by the UE, and the selecting procedure includes the following steps 3041~3044:

3041, let the transmission delay from the measurement cell i to the UE be $\tau_i$, the transmission delay from the serving cell to the UE be $\tau$, the judging delay threshold be $\tau_{th}$;

3042, let the RSRP value located at the UE of the measurement cell i be $RSRP_i$, the RSRP value located at the UE of the serving cell be RSRP, and the judging RSRP threshold be $RSRP_{th}$;

3043, the cells with $|\tau_i-\tau| \leq \tau_{th}$ and $RSRP_i \geq RSRP_{th}$ are selected and included to the UE's candidate CCS;

3044, delay threshold $\tau_{th}$ is judged, and RSRP threshold $RSRP_{th}$ is judged; UE's service can be requested to be adjusted semi-statically according to system status.

305, the eNodeB, to which the serving cell of the UE belongs, sends the CCS establishment request to the eNodeB, to which the CoMP cooperating cells in the determined candidate CCS belong and which is different from the eNodeB to which said serving cell belongs, via an X2 application protocol (X2AP) message of the control plane of the LTE X2 interface. The message includes the ID of the serving cell in which the UE is, the target cell ID, the UE X2AP ID, and the UE service bearing information, the CoMP communication mode information and the period of sending CCS establishment response information, etc.

306, the eNodeB to which the CoMP cooperating cells which have received the CCS establishment request belong makes response to the CCS establishment request to the eNodeB to which the serving cell of the UE belongs, and this step further includes that after the eNodeB to which the CoMP cooperating cells belong receives the CCS establishment request, it determines whether to accept the CCS establishment request according to the load and resource usage condition of the cell identified in the CCS establishment request and the UE service bearing information provided in the CCS establishment request.

307, the eNodeB to which the CoMP cooperating cells which have received the CCS establishment request sends the CCS establishment response information to the eNodeB to which the serving cell of the UE belongs according to the period of sending CCS establishment response information in the CCS establishment request in Step 305. The response information includes the ID of the serving cell in which the UE is, the target cell ID, and ID of accepting or rejecting CoMP. Wherein, if the cell which sends the response information accepts the CCS establishment request, it sends the acceptance ID; otherwise it sends the rejection ID; meanwhile, it can also send information about rejection reasons.

308, the eNodeB to which the serving cell of the UE belongs receives the CCS establishment response from each cell in the candidate CCS, and includes the cells which accept the request into the CCS, and determines UE's CCS finally. If all cells in the candidate CCS reject the request, the procedure returns Step 301 to reselect the CCS.

309, the eNodeB to which the serving cell of the UE belongs sends user data information to all the cells in the CCS via the user plane of LTE X2 interface. The CoMP cooperating set establishment is completed.

Embodiment II

Figure 4:
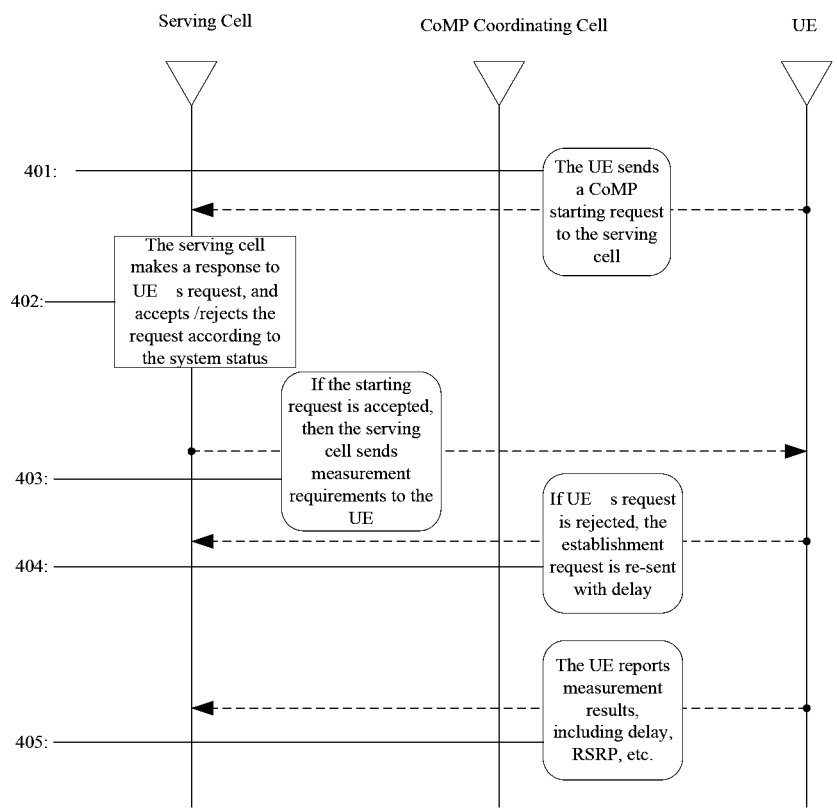
FIG. 4 is a time sequence chart of CCS establishment and information exchanges of embodiment II of the present invention.

As shown in FIG. 4, Steps 401~403 in the present embodiment are different from Steps 301~303 in Embodiment I:

401, the UE sends a request of starting CoMP communication to the network side according to its service demands.

401~403, after the network side receives the UE's request, it determines whether to start CoMP communication in respect of said UE according to present system status and UE service demands, and sends a decision to the UE. If the network side rejects UE's request, then the UE re-sends the request after a period of time. Steps 404~409 are the same as Steps 304~309 in Embodiment I.

Embodiment III

Figure 5:
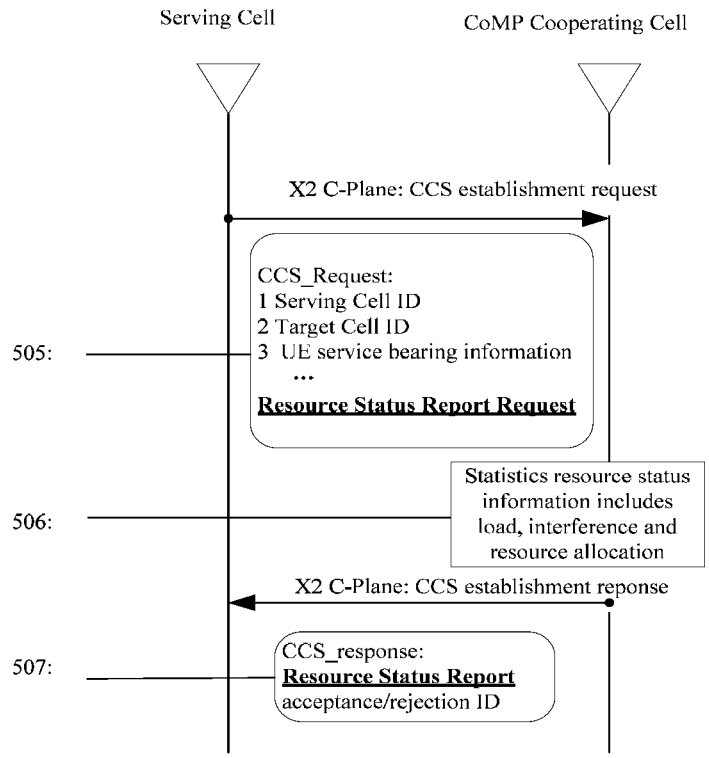
FIG. 5 is a time sequence chart of CCS establishment and information exchanges of embodiment III of the present invention.

Steps 501~504 and Steps 508 and 509 in Embodiment III are the same as Steps 301~304 and Steps 308 and 309 in Embodiment I, and Steps 505~507 are as the following (as shown in FIG. 5):

505, the CCS establishment request sent to the eNodeB to which the cells in the candidate CCS belong by the eNodeB to which the serving cell of the UE belongs further includes, besides said information in Step 305, resource status report request, and the request is for the eNodeB to which the serving cell of the UE belongs to request the eNodeBs, to which CoMP cooperating cells in candidate CCS determined in Step 504 belong and which is different from the eNodeB which the serving cell belongs, to report related information of the present resources status of the CoMP cooperating cells; the related information of the resources status further includes system load condition of the CoMP cooperating cells, usage allocation condition of CoMP cooperating cell resources, interference condition of CoMP cooperating cell resources.

506, after the eNodeB to which CoMP cooperating cell that receives the CCS establishment request belongs decides to accept the request, it conducts the statistics on resource usage condition of said CoMP cooperating cell.

507, the eNodeB to which CoMP cooperating cell that receives the CCS establishment request belongs sends the establishment response information to the eNodeB to which the serving cell of the UE belongs; if the eNodeB to which said CoMP cooperating cell belongs accepts the CCS establishment request, the response information further includes resource status report information besides said information in Step 307; if the eNodeB to which said CoMP cooperating cell belongs rejects the CCS establishment request, the response information is the same as said information in Step 307.

In the above mentioned FIG. 3 to FIG. 5, Serving Cell represents the serving cell, CCS_Resquest represents the CCS establishment request, CCS_Rsponse represents the CCS establishment response, X2 C-Plane represents the control plane of LTE X2 interface, and CoMP mode represents the coordinated multi-points transmission/reception mode.

Embodiment IV

Figure 6:
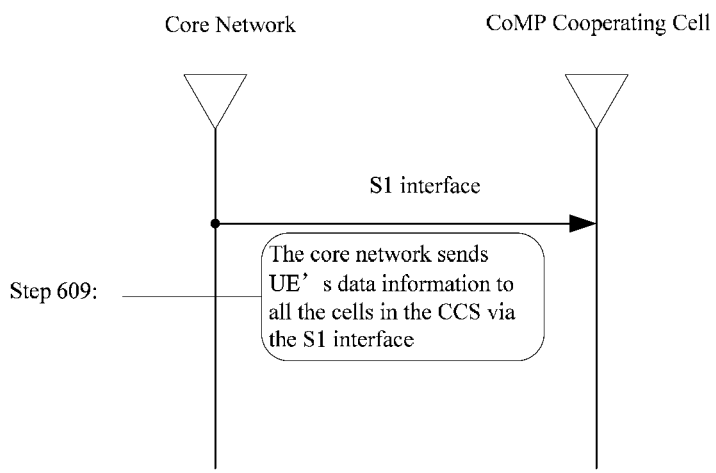
FIG. 6 is a time sequence chart of CCS establishment and information exchanges of embodiment IV of the present invention.

Steps 601~608 in Embodiment IV are the same as Steps 301~308 in Embodiment I, and Step 609 is as the following, as shown in FIG. 6:

609, the core network sends user data information to all the cells in the CCS via user plane of LTE S1 interface. The CCS establishment is completed.

The preferred embodiments above are only used to illustrate the invention, rather than to limit the present invention. A person of ordinary skills in the relevant technical fields without departing from the spirit and scope of the present invention can also make various modifications and changes, so all equivalent technical solutions belong to the scope of the present invention, and the scope of patent protection of this invention should be defined by claims.

INDUSTRIAL APPLICATION

This invention designs a CoMP cooperating set establishment method in joint processing circumstance of CoMP communication, and this method may reduce delay of information exchanges, and decrease overhead and complexity of the communication system.

The invention claimed is:

1. A method for establishing CoMP cooperating set in coordinated multi-point communication, comprising the following steps:
   S1, triggering and starting a CoMP communication process;
   S2, the evolution base station eNodeB, to which a serving cell of a user equipment (UE) belongs, configuring a measurement set, and sending the configured measurement set to the UE, and meanwhile the UE measuring the channel state information (CSI) of all the cells in said measurement set;
   S3, the UE feeding back measurement results to the eNodeB, to which the serving cell of the UE belongs;
   S4, the eNodeB, to which the serving cell of the UE belongs, determining a candidate CoMP cooperating set (CCS) of the UE;
   S5, the eNodeB, to which the serving cell of the UE belongs, sending a CCS establishment request to other eNodeBs, wherein said other eNodeBs are the eNodeBs, to which the CoMP cooperating cells in the candidate CoMP cooperating set belong and wherein said other eNodeBs differ from the eNodeB to which said serving cell of the UE belongs;
   S6, said other eNodeBs that receive the CCS establishment request, to which the CoMP cooperating cells in the candidate CoMP cooperating set belong, making a response to said CCS establishment request to the eNodeB, to which the serving cell of the UE belongs, and sending CCS establishment response information to the eNodeB, to which the serving cell of the UE belongs, S6 further comprising:

S61, after receiving the CCS establishment request, said other eNodeBs determining whether to accept the CCS establishment request according to the load and resource usage condition of the cell identified in the CCS establishment request and the UE service bearing information provided in the CCS establishment request;

S62, said other eNodeBs sending the CCS establishment response information to the eNodeB, to which the serving cell belongs, wherein if the CCS establishment request is accepted, sending an acceptance ID and preparing to receive the UE's data information, and if the CCS establishment request is rejected, sending a rejection ID; and S63, if the resource status report request information is included in the CCS establishment request and at least one of said other eNodeBs accepts the CCS establishment request, sending the resource status report request information;

S7, the eNodeB, to which the serving cell of the UE belongs, determining the UE's CCS according to said CCS establishment response information; and S8, according to a CoMP communication mode, all the cells in the UE's CCS sharing data information and service bearing information of the UE to which said CCS belongs.

2. The method according to claim 1, wherein said CoMP being UE-specific, said CoMP cooperating set being also UE-specific, each UE corresponding to one CoMP cooperating set, and UE's serving cell being included in the CCS corresponding to the UE.

3. The method according to claim 1, wherein said triggering and starting a CoMP communication process being launched by the UE or the network side.

4. The method according to claim 3, wherein, in Step 1, the steps of triggering and starting CoMP processes being launched by the UE comprising:

UE sending a CoMP communication process starting request to the network side according to its service demands and present channel state information, then the network side determining whether to start CoMP communication process for the user according to present system status and user related information; and the steps of triggering and starting a CoMP communication process being launched by the network side comprising:

the network side deciding whether to start according to UE's service demands and present system status, and executing a procedure of starting CoMP processes when deciding to start.

5. The method according to claim 1, wherein, in Step 4, the method of the eNodeB to which the serving cell of the UE belongs selecting UE's candidate CCS according to measurement result fed back by the UE being: one or more of the method based on delay skew, the method of RSRP intensity based on received reference signals, the method based on channel state information and the method based on channel quality indicator (CQI).

6. The method according to claim 1, wherein, in Step 5, the format of the CCS establishment request sent by the eNodeB to which the serving cell of the UE belongs being an X2 application protocol message of control plane of LTE X2 interface.

7. The method according to claim 6, wherein the CCS establishment request comprising one or more of following information:

the ID of the serving cell of the UE, the target cell ID, the UE identification information, UE's service bearing information;

the period of sending the CCS establishment response information by the eNodeB to which all the cells in said candidate CCS belong;

a resource status report request, and the resource status report request being for the eNodeB to which the serving cell of the UE belongs, to request the eNodeBs, to which CoMP cooperating cells in the determined candidate CCS belong and which being different from the eNodeB to which the serving cell belongs, to report the present resources status related information of the CoMP cooperating cells; and information of CoMP communication mode.

8. The method according to claim 1, wherein, in Step S7, after the eNodeB, to which the serving cell belongs, receiving the CCS establishment response from the eNodeBs, to which the candidate cooperating cells belong, including the serving cell of the UE and the cell that accepts the CCS establishment request into the CCS so as to determine UE's CCS finally, if all the cooperating cells in the candidate CCS rejects the CCS establishment request, returning to Step S1 to reselect.

9. The method according to claim 1, wherein, in Step S8, after the CCS is determined, all the cells in CCS sharing data information of the UE to which said CCS belongs, wherein the way of sharing data information is: the eNodeB to which the serving cell of the UE belongs sending UE's data information to each CoMP cooperating cell in the CCS via user plane of the LTE X2 interface; or a core network sending UE's data information directly to each CoMP cooperating cell in the CCS via user plane of LTE S1 interface.

* * * * *